(12) United States Patent
Kendi et al.

(10) Patent No.: US 9,376,585 B2
(45) Date of Patent: Jun. 28, 2016

(54) COATING COMPOSITIONS CAPABLE OF PRODUCING SURFACES WITH DRY-ERASE PROPERTIES

(71) Applicants: Bayer MaterialScience LLC, Pittsburgh, PA (US); Sumika Bayer Urethane Co., Ltd., Amagasaki (JP)

(72) Inventors: Margaret A. Kendi, Coraopolis, PA (US); Steven Owens, Sewickley, PA (US); Makoto Nakao, Nishinomiya (JP)

(73) Assignees: Covestro LLC, Pittsburgh, PA (US); Sumika Bayer Urethane Co., Ltd., Amagasaki (JP)

( * ) Notice: Subject to any disclaimer, the term of this patent is extended or adjusted under 35 U.S.C. 154(b) by 0 days.

(21) Appl. No.: 14/468,912

(22) Filed: Aug. 26, 2014

(65) Prior Publication Data
US 2016/0060477 A1    Mar. 3, 2016

(51) Int. Cl.
| | |
|---|---|
| *C09D 125/14* | (2006.01) |
| *B43K 8/02* | (2006.01) |
| *C09D 133/02* | (2006.01) |
| *C08F 212/08* | (2006.01) |
| *C09D 125/04* | (2006.01) |
| *C08K 5/34* | (2006.01) |

(52) U.S. Cl.
CPC .............. *C09D 125/14* (2013.01); *B43K 8/024* (2013.01); *C08F 212/08* (2013.01); *C09D 125/04* (2013.01); *C09D 133/02* (2013.01); *C08K 5/34* (2013.01)

(58) Field of Classification Search
None
See application file for complete search history.

(56) References Cited

U.S. PATENT DOCUMENTS

| | | | | |
|---|---|---|---|---|
| 4,278,578 A | * | 7/1981 | Carpenter ............ | C09D 133/08 428/423.3 |
| 4,301,239 A | * | 11/1981 | Miller ................. | C09D 133/064 430/510 |
| 4,563,307 A | * | 1/1986 | Briden ................. | C08K 5/3412 526/263 |
| 5,075,370 A | | 12/1991 | Kubitza et al. | |
| 5,227,201 A | | 7/1993 | Harper | |
| 5,466,536 A | * | 11/1995 | Berner ................. | G03C 1/7614 428/520 |
| 5,508,340 A | | 4/1996 | Hart | |
| 5,574,083 A | * | 11/1996 | Brown ................. | C08G 18/025 252/182.23 |
| 5,783,303 A | * | 7/1998 | Tsuei ....................... | B24D 3/28 428/354 |
| 5,798,415 A | | 8/1998 | Corpart et al. | |
| 5,852,111 A | | 12/1998 | Watanabe et al. | |
| 6,197,874 B1 | | 3/2001 | Irle et al. | |
| 6,420,474 B1 | | 7/2002 | Carey et al. | |
| 6,706,801 B1 | | 3/2004 | Blum et al. | |
| 7,807,752 B2 | | 10/2010 | Masutani et al. | |
| 8,143,348 B2 | | 3/2012 | Kania et al. | |
| 8,309,653 B2 | | 11/2012 | Goscha et al. | |
| 8,461,253 B2 | | 6/2013 | Ambrose et al. | |
| 2007/0142517 A1 | | 6/2007 | Anderson, Sr. et al. | |
| 2007/0238824 A1 | | 10/2007 | Smak et al. | |
| 2009/0324936 A1 | * | 12/2009 | Kim ........................ | C08F 36/04 428/335 |
| 2011/0143330 A1 | | 6/2011 | Shimada et al. | |
| 2012/0157595 A1 | * | 6/2012 | Gaston .................. | C09D 7/005 524/400 |
| 2013/0189501 A1 | | 7/2013 | Gringoire et al. | |
| 2014/0015912 A1 | | 1/2014 | Brandstein et al. | |

FOREIGN PATENT DOCUMENTS

| | | |
|---|---|---|
| CA | 2849186 A1 | 4/2013 |
| CN | 103897571 A | 7/2014 |
| EP | 0694337 A1 | 1/1996 |
| WO | 2005071023 A1 | 8/2005 |
| WO | 2009029512 A2 | 3/2009 |

* cited by examiner

*Primary Examiner* — Satya Sastri
(74) *Attorney, Agent, or Firm* — John E. Mrozinski, Jr.

(57) ABSTRACT

Disclosed are waterborne coating compositions that include: (a) a base-neutralized carboxylic acid functional polyacrylate; and (b) a water-miscible polyaziridine, in which the composition is substantially free of isocyanate functionality. Also disclosed are methods of using such compositions to produce a dry-erase surface and kits that include such compositions.

14 Claims, No Drawings

COATING COMPOSITIONS CAPABLE OF PRODUCING SURFACES WITH DRY-ERASE PROPERTIES

FIELD

The present invention relates to waterborne coating compositions. The coating compositions comprise: (a) a base-neutralized carboxylic acid functional polyacrylate; and (b) a water-miscible polyaziridine. The present invention also relates to, among other things, the use of such coating compositions, in the production of, for example, surfaces with dry-erase properties, as well as kits that include such a coating composition.

BACKGROUND INFORMATION

Surfaces that exhibit dry-erase properties can be written on with marker pens, such as, but not limited to, dry-erase marker pens, and wiped clean with a dry cloth, a dry paper towel, a dry tissue, or a dry eraser, for example. Dry-erase surfaces may be used in, for example, classrooms, corporate offices, and homes.

Coating formulations have been proposed that provide a surface that is resistant to graffiti, such as might be produced from a marker pen, such as, but not limited to, dry-erase marker pens. As such, these formulations provide a surface that exhibits dry-erase properties. Some of these formulations are two-component waterborne compositions in which one component comprises a polyacrylate polyol and another component comprises an isocyanate-functional cross-linker. These formulations, however, can have a very limited pot-life and should be applied by skilled and well-trained paint applicators that are familiar with handling such materials in the proper manner.

Other coating formulations that have been proposed to provide a surface exhibiting graffiti-resistant/dry-erase properties may require special curing equipment to cure the coating at elevated temperature and/or with actinic radiation. Still other coating formulations may require specialized fluoro- and/or silicon-based materials.

In addition to producing an initially dry-erasable surface, it is desirable that a coating composition produce a cured coating that provides a dry-erasable surface after long term exposure to a dry-erase marking. That is, the coated surface should be dry-erasable even when a marking from a marker pen, such as a dry-erase marker pen, is left on the surface for a long period of time, such as up to 5 days.

In addition, often for environmental reasons, waterborne coating compositions are sometimes preferred over organic solvent-borne compositions.

As a result, it would be desirable to provide improved waterborne coatings compositions that can be cured at ambient conditions to provide a surface that exhibits both initial and long-term graffiti-resistance/dry-erase properties. The present invention was made in view of the foregoing.

SUMMARY

In some respects, the present invention is directed to waterborne coating compositions that comprise: (a) a base-neutralized carboxylic acid functional polyacrylate having a calculated glass transition temperature ("Tg") of greater than 50° C.; and (b) a water-miscible polyaziridine. In these coating compositions, the polyacrylate is a reaction product of reactants comprising: (a1) at least 50% by weight of a hardening vinyl aromatic monomer, based on the total weight of the reactants; (a2) a plasticizing ethylenically unsaturated monomer that does not include carboxylic acid or hydroxyl groups; and (a3) a carboxylic-acid functional ethylenically unsaturated monomer. These coating compositions are substantially free of isocyanate functionality.

The present invention is also directed to, among other things, substrates at least partially coated with a coating deposited from such a coating composition, methods for coating a substrate using such a coating composition, and kits comprising such a coating composition and a marker pen.

It is understood that the invention disclosed and described in this specification is not limited to the embodiments summarized in this Summary. The reader will appreciate the foregoing details, as well as others, upon considering the following detailed description of various non-limiting and non-exhaustive embodiments according to this specification.

DETAILED DESCRIPTION

Various embodiments are described and illustrated herein to provide an overall understanding of the structure, function, operation, manufacture, and use of the disclosed products and processes. The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicants reserve the right to amend the claims to affirmatively disclaim features or characteristics that may be present in the prior art. Therefore, any such amendments comply with the requirements of 35 U.S.C. §112 and 35 U.S.C. §132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

Reference herein to "certain embodiments", "some embodiments", "various non-limiting embodiments," or the like, means that a particular feature or characteristic may be included in an embodiment. Thus, use of such phrases, and similar phrases, herein does not necessarily refer to a common embodiment, and may refer to different embodiments. Further, the particular features or characteristics may be combined in any suitable manner in one or more embodiments.

Thus, the particular features or characteristics illustrated or described in connection with various embodiments may be combined, in whole or in part, with the features or characteristics of one or more other embodiments. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. §112 and 35 U.S.C. §132(a).

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more. As used herein, "molecular weight", if used in reference to a polymer, refers to the number average molecular weight ("Mn"), unless otherwise specified. Further, as will be appreciated, the Mn of a polymer containing functional groups, such as a polyol, can be calculated from the functional group number, such as hydroxyl number, which is determined by end-group analysis.

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure thereof. As used herein, the term "cycloaliphatic" refers to organic compounds characterized by arrangement of carbon atoms in closed ring structures. Cycloaliphatic compounds do not contain aromatic rings as part of the molecular structure of the compounds. Therefore, cycloaliphatic compounds are a subset of aliphatic compounds. Therefore, the term "aliphatic" encompasses aliphatic compounds and/or cycloaliphatic compounds.

As used herein, "(meth)acrylate" is meant to encompass methacrylate and acrylate. As used herein, "(meth)acrylic" is meant to encompass methacrylic and acrylic.

As previously indicated, certain embodiments of the present invention are directed to coating compositions. As used herein, the term "coating composition" refers to a mixture of chemical components that will cure and form a coating when applied over a substrate.

The coating compositions disclosed herein may be embodied as one-component or two-component compositions. As used herein, the term "two-component" refers to a coating composition comprising at least two reactive components that are stored in separate containers. For example, in embodiments of the present invention, component (a) and component (b) are stored in separate containers. Other ingredients may, of course, be stored with component (a) and/or component (b) or separately from component (a) and component (b).

As used herein, the term "one-component" refers to a coating composition in which the reactive components are stored together in a single container. For example, in embodiments of the present invention, (a) and (b) can be stored together in a single container and have a pot life of at least 1 week, such as at least 2 weeks or at least 4 weeks when stored at ambient conditions, which, as used herein, means 23° C. and atmospheric pressure. As used herein, "pot life" refers to the time it takes for the viscosity of the coating composition to increase to 10 times the initial viscosity of the composition. By way of example, if the initial viscosity of a composition is 100 cPs at 23° C., then the pot life of the composition would be the amount of time it takes for the composition to reach a viscosity of 1000 cPs at 23° C. The viscosity of the compositions of the present invention is determined in the manner described in the Examples.

As indicated, the coating compositions of the present invention are waterborne coating compositions. As used herein, "waterborne" means that the principal solvent or carrier fluid, i.e., the continuous phase, in the coating composition is water. For example, in certain embodiments, the continuous phase is at least 70, in some cases at least 80 or at least 85 percent by weight water, based on the total weight of the continuous phase. Moreover, certain coating compositions of the present invention comprise no more than 350 grams, such as no more than 300 grams or no more than 250 grams of volatile organic compound ("VOC") per liter of the coating composition. As used herein, VOC refers to any compound of carbon, excluding carbon monoxide, carbon dioxide, carbonic acid, metallic carbides or carbonates, and ammonium carbonate, which participates in atmospheric photochemical reactions and corresponds to the compounds as set forth in 40 CFR Part 51.100(s) (as of Mar. 26, 2014).

In certain embodiments, the coating compositions of the present invention have an initial viscosity at 23° C. of less than 1000 cPs, such as less than 500 cPs, less than 300 cPs, less than 200 cPs, or, in some cases, less than 100 cPs. The viscosity values of a coating composition of the present invention as reported herein determined in the manner described in the Examples.

In certain embodiments, the waterborne coating compositions of the present invention are prepared by mixing (a) an aqueous dispersion comprising a base-neutralized carboxylic acid functional polyacrylate with (b) a water-miscible polyaziridine.

In the coating compositions of the present invention, the base-neutralized carboxylic acid functional polyacrylate has a calculated Tg of greater than 50° C., such as at least 60° C., at least 65° C. or at least 70° C. For purposes of the present invention, the calculated Tg of a polyacrylate is determined according to the Fox equation. According to the Fox equation, the glass transition temperature (in Kelvin) of a polyacrylate copolymer can be calculated as follows:

$$\frac{1}{T_g} = \frac{M^1}{T_{g1}} + \frac{M^2}{T_{g2}} + \ldots \frac{M^n}{T_{gn}}$$

in which $M^1, M^2, \ldots, M^n$ are the mass fraction of monomers $1, 2, \ldots, n$ used to make the copolymer and $Tg^1, Tg^2, \ldots, Tg^n$ are the glass transition temperatures in Kelvin of a homopolymer of the monomers $1, 2, \ldots, n$. For purposes of the present invention, the glass transition temperatures of such a homopolymer of a monomer (some of which are identified below) are values shown in Polymer Handbook, 4th ed., edited by J. Brandrup, E. H. Immergut and E. A. Grulke, John Wiley & Sons, Inc., 1999 at VI/198 to VI/219, the cited portion of which being incorporated herein by reference. As will be appreciated, temperature in Kelvin (K) can be converted to temperature in ° C. according to the following equation:

Temperature (° C.)=Temperature (K)−273.15

The polyacrylate used in the coating compositions of the present invention can be prepared using any of a variety of free-radical polymerization methods, such solution polymerization, emulsion polymerization and suspension polymerization. Continuous and discontinuous polymerization processes are possible. In some embodiments, water, optionally together with an emulsifier or surface-active substance and optionally with portions of the reactants and optionally with portions of an initiator or of an initiator mixture, is initially introduced into a reaction vessel and heated to the desired reaction temperature. The reactants or the remainder of the reactants and initiator or portion of the initiator, optionally together with emulsifier or of the surface-active substance, are then metered in. If desired, when the addition of the reactants has ended, a small amount of initiator can subsequently be added again.

The polymerization, such as emulsion polymerization, can be carried out by a one-stage or by a multi-stage polymerization process, wherein, in the multi-stage process, identical or different monomer mixtures in identical or different amounts and identical or different initiators and/or emulsifiers or initiator and/or emulsifier concentrations can be employed in each stage. With a multi-stage polymerization process it is possible to prepare polyacrylates with a core-shell morphology, such as, for example, with a low Tg (≤50° C.) core and a high Tg (>50° C.) shell or a high Tg (>50° C.) core and a low Tg (≤50° C.) shell. In the multi-stage procedure with core-shell morphology, the content of the core is sometimes 20 to 80, such as 35 to 65 wt. %, based on the total solids content of the emulsion. In embodiments of the present invention, the polyacrylate does not have a core-shell morphology.

Suitable initiators can be water-soluble or water-insoluble substances or substance mixtures which form free radicals. Such substances are often employed in amounts of 0.025 to 3, such as 0.1 to 0.75, or, in some cases, 0.15 to 0.45% by weight, based on the amount of reactants employed. Suitable initiators include, but are not limited to, hydrogen peroxide, benzoyl peroxide, cumene hydroperoxide, dibenzyl peroxydicarbonate, di-tert-butyl peroxide, tert-butyl hydroperoxide, tert-butyl peroctoate, ammonium peroxodisulfate, sodium peroxodisulfate, potassium peroxodisulfate, azoisobutyric acid dinitrile, dibenzoyl peroxide, tert-butyl perpivalate and tert-butyl perbenzoate. In the case of redox systems, reducing agents, such as, for example, isoascorbic acid, ascorbic acid, sodium bisulfite, salts of hydroxymethanesulfinic acid and/or formamidine-sulfinic acid (Rongalit C), optionally also in combination with iron(II) sulfate and EDTA (Trilon B), can be additionally employed. With these, polymerization reactions can also be carried out at lower temperatures.

The polymerization is often carried out at a temperature of 30 to 95° C., such as 45 to 85° C. In addition, if desired, molecular weight regulators can be employed, such as, for example, n- or tert-dodecylmercaptan.

The polymer particle size can be influenced, for example, by the amount of emulsifier, emulsifier mixtures or surface-active substances employed. Emulsifiers are often employed in amounts of 0.25 to 7.0, such as 0.5 to 3.0, or, in some cases, 1.0 to 2.0% by weight, based on the total weight of reactants used to make the polyacrylate. The average polymer particle size is, in some embodiments, 10 to 600, such as 30 to 180 nanometers. As will be appreciated, it is also suitable to have polymer particles of different average particles sizes.

In certain embodiments, the polyacrylate is prepared by emulsion polymerization in the presence of an emulsifier comprising anionic and/or nonionic structural units. Anionic emulsifiers often are compounds that contain sulfonate, sulfate, carboxylate, phosphate or phosphonate groups as anionic groups. In certain embodiments, the emulsifier has long-chain alkyl or aryl radicals and a hydrophilic polyether chain based on ethylene oxide or ethylene oxide/propylene oxide and bonded to a hydroxyl group, and additionally containing a sulfonate, sulfate, phosphonate or phosphate group. Ammonia, amines or other bases are suitable for converting the acid groups into salt groups. Suitable nonionic emulsifiers, which can be employed, sometimes in combination with ionic emulsifiers, include, for example, ethoxylated or ethoxylated/propoxylated fatty acids, ethoxylated or ethoxylated/propoxylated alkylphenols, ethoxylated or ethoxylated/propoxylated long-chain alcohols, such as, for example, stearyl alcohol, oleyl alcohol or lauryl alcohol, ethoxylated or ethoxylated/propoxylated long-chain amines, such as, for example, stearylamine, and/or ethoxylated or ethoxylated/propoxylated abietic acid.

Other surface-active substances, such as, for example, polyvinyl alcohols, polyvinylpyrrolidone and polyacrylic acid salts, can also be used if desired.

The use of relatively small amounts of organic solvents, such as, for example, butyl glycol, xylene, toluene, methoxypropyl acetate, methyl isobutyl ketone, methoxypropanol, butyl glycol acetate and/or N-methylpyrrolidone, is also possible if desired.

The polyacrylate used in the coating compositions of the present invention is prepared from reactants comprising: (a1) a hardening vinyl aromatic monomer, (a2) a plasticizing ethylenically unsaturated monomer that does not include carboxylic acid or hydroxyl groups; (a3) a carboxylic-acid functional ethylenically unsaturated monomer, (a4) optionally a hydroxyl functional ethylenically unsaturated monomer, (a5) optionally a hardening (meth)acrylic acid ester that does not include carboxylic acid or hydroxyl groups; and (a6) optionally other monomers. In these polyacrylates, reactants (a1)-(a6) are each different from each other. In these polyacrylates, reactant (a1) is used in an amount of at least 50% by weight, based on the total weight of reactant used to make the polyacrylate.

As used herein, the term "hardening vinyl aromatic monomer" refers to a vinyl aromatic monomer in which a homopolymer of the monomer has Tg of at least 60° C.

(333.15 K) or at least 70° C. (343.15 K) or at least 80° C. (353.15 K) or at least 90° C. (363.15 K) or at least 100° C. (373.15 K). Specific examples of suitable hardening vinyl aromatic monomers (a1) include, without limitation, 2,4-dimethylstyrene (Tg of 385 K), 2,5-dimethylstyrene (Tg of 416 K), 3,4-dimethylstyrene (Tg of 384 K), 3,5-dimethylstyrene (Tg of 377 K), 2-ethylstyrene (Tg of 376 K), α-methylstyrene (Tg of 455 K), 2-methylstyrene (Tg of 409 K), 3-methylstyrene (Tg of 370 K), 4-methylstyrene (Tg of 366 K), 4-methoxystyrene (Tg of 386 K), and styrene (Tg of 373 K), as well as mixtures thereof.

In certain embodiments of the present invention, the monomer (a1) comprises styrene. In certain embodiments, styrene is used in an amount of at least 50% by weight, such as greater than 50, at least 60, at least 70, at least 80, at least 90, or, in some cases 100% by weight, based on the total weight of reactant (a1).

In certain embodiments of the polyacrylate used in the compositions of the present invention, reactant (a1), such as styrene, is used in an amount of greater than 50% by weight, at least 60, or at least 65% by weight and/or up to 95% by weight, based on the total weight of reactants used to make the polyacrylate. In some embodiments, reactant (a1), such as styrene, is used in an amount of up to 90 or up to 80% by weight, based on the total weight of reactants used to make the polyacrylate.

As used herein, the term "plasticizing ethylenically unsaturated monomer" refers to an ethylenically unsaturated monomer, such as a (meth)acrylic acid ester, in which the Tg of a homopolymer of the monomer is less than 20° C. (293.15 K), such as no more than 10° C. (283.15 K), no more than 0° C. (273.15 K) or, in some cases, no more than −10° C. (263.15 K) or no more than −20° C. (255.15 K) or no more than −30° C. (243.15 K) or no more than −40° C. (233.15 K) or no more than −50° C. (223.15 K). Examples of such monomers include, but are not limited to, methyl acrylate (Tg of 283 K), ethyl acrylate (Tg of 249 K), n-propyl acrylate (Tg of 236 K), isopropyl acrylate (Tg of 262 K), n-butyl acrylate (Tg of 219 K), iso-butyl acrylate (Tg of 249 K), n-hexyl acrylate (Tg of 216 K), 2-ethylhexyl acrylate (Tg of 223 K), dodecyl acrylate (Tg of 270 K), n-hexyl methacrylate (Tg of 268 K), n-octyl methacrylate (Tg of 253 K), 2-ethylhexyl methacrylate (Tg of 263 K), decyl methacrylate (Tg of 203 K), dodecyl methacrylate (Tg of 208 K), as well as mixtures thereof.

In certain embodiments of the present invention, the reactant (a2) comprises n-butyl acrylate. In certain embodiments, n-butyl acrylate is used in an amount of at least 50% by weight, such as at least 60, at least 70, at least 80, at least 90, or, in some cases 100% by weight, based on the total weight of reactant (a2).

In certain embodiments of the polyacrylate used in the compositions of the present invention, reactant (a2), such as n-butyl acrylate, is used in an amount of at least 1% by weight, such as at least 2, or at least 5% by weight and/or up to 20% by weight, such as up to 15% by weight, based on the total weight of reactants used to make the polyacrylate.

Suitable monomers (a3) for the preparation of the polyacrylate used in the compositions of the present invention include, without limitation, (meth)acrylic acid, maleic acid, maleic anhydride, fumaric acid, crotonic acid, maleic acid monoalkyl esters, fumaric acid monoalkyl esters, itaconic acid and propylacrylic acid. Suitable acid-functional monomers also includes monomers with acid anhydride groups or with blocked acid groups or with potential acid groups.

In certain embodiments of the polyacrylate used in the compositions of the present invention, reactant (a3), such as methacrylic acid and/or acrylic acid, is used in an amount of at least 1% by weight, such as at least 2% by weight, and/or up to 10% by weight, such as up to 5% by weight, based on the total weight of reactants used to make the polyacrylate. In certain embodiments of the polyacrylate used in the compositions of the present invention, reactant (a3), such as methacrylic acid and/or acrylic acid, is used in an amount sufficient to provide the polyacrylate with an acid value of 1 to 30 mg KOH/gram solids, such as 5 to 30 mg KOH/gram solids or, in some cases, 5 to 15 mg KOH/gram solids.

In certain embodiments, the sum of reactants (a1) and (a3) comprises at least 70% by weight, based on the total weight of the reactants used to make the polyacrylate.

Suitable monomers (a4) for the preparation of the polyacrylate used in the coating compositions of the present invention include, without limitation, hydroxy-functional acrylic acid or methacrylic acid esters, such as hydroxyethyl acrylate, hydroxyethyl methacrylate, hydroxypropyl acrylate, hydroxypropyl methacrylate, hydroxybutyl acrylate, hydroxybutyl methacrylate, polypropylene glycol monoacrylate, polypropylene glycol monomethacrylate, polyethylene glycol monoacrylate, polyethylene glycol monomethacrylate, polyethylene glycol-polypropylene glycol monomethacrylate and polyethylene glycol-polypropylene glycol monoacrylate, reaction products of methacrylic acid or acrylic acid and Cardura E10 (glycidyl ester of versatic acid), reaction products of the monomers mentioned and also other hydroxy-functional copolymerizable monomers withεcaprolactone, and mixtures of the monomers mentioned, also with other hydroxy-functional monomers.

In certain embodiments of the polyacrylate used in the compositions of the present invention, reactant (a4) is used in an amount of at least 1% by weight, such as at least 10% by weight, and/or up to 30% by weight, such as up to 20% by weight, based on the total weight of reactants used to make the polyacrylate. In certain embodiments, the hydroxyl group content of the polyacrylate used in the coating compositions of the present invention is 0 to 8, such as 0 to 5, or, in some cases, 0.2 to 3.5 wt. %.

As indicated, in certain embodiments, reactant (a5), a hardening (meth)acrylic acid ester that does not include carboxylic acid or hydroxyl groups, may be used to prepare the polyacrylate. As used herein, the term "hardening (meth)acrylic acid ester" refers to a (meth)acrylic acid ester in which a homopolymer of the monomer has Tg of at least 60° C. (333.15 K) or at least 70° C. (343.15 K) or at least 80° C. (353.15 K) or at least 90° C. (363.15 K) or at least 100° C. (373.15 K). Specific examples of suitable monomers (a5) include, but are not limited to, methyl methacrylate (Tg of 378 K), ethyl methacrylate (Tg of 338 K), iso-propyl methacrylate (Tg of 354 K), iso-butyl methacrylate (Tg of 326 K), tert-butyl methacrylate (Tg of 391 K), cyclohexyl methacrylate (Tg of 356 K), isobornyl methacrylate (Tg of 383 K), isobornyl acrylate (Tg of 367 K), phenyl methacrylate (Tg of 383 K) and mixtures of any two or more thereof.

Suitable other monomers (a6) for the preparation of the polyacrylate used in the coating compositions of the present invention include, without limitation, n-butyl methacrylate (Tg of 293 K), n-propyl methacrylate (Tg of 308 K), vinyl chloride, vinylidene chloride, N-methylolacrylamide, acrylamide, methacrylamide, N-methylolmethacrylamide, diacetone-acrylamide, glycidyl methacrylate, glycidyl acrylate, N-vinylpyrrolidone, acetoacetylethyl methacrylate, acetoacetylethyl acrylate, isocyanatoethyl methacrylate, N,N'-dimethylaminomethacrylate, vinyltriethoxysilane, vinyltrimethoxysilane, methacryloxypropyltrimethoxysilane, vinyl ethers, allyl ethers, allyl esters, vinyl esters, vinyl acetate and vinyl butyrate.

Other monomers (a6) can also be oligomeric or polymeric substances with at least one copolymerizable group, and substances with more than one copolymerizable group, such as e.g. divinylbenzene, 1,6-hexanediol bisacrylic acid ester, trimethylolpropane trisacrylic acid ester, ethoxylated bisphenol A dimethacrylate, triethylene glycol dimethacrylate, polyethylene glycol dimethacrylate, dicyclopentadienyl methacrylate, trimethylolpropane-diallyl ether, butadiene, cyclooctatetraene, polybutadienes, reaction products of polyesters or polyethers or polyepoxides with (meth)acrylic acid and reaction products of polyisocyanates with hydroxyethyl(meth)acrylate and/or hydroxypropyl(meth)acrylate and/or hydroxybutyl(meth)acrylate.

As indicated, in the coating compositions of the present invention, carboxylic acid groups of the polyacrylate are base-neutralized. Such neutralization can take place before, during or after the polymerization. Suitable neutralizing agents include, but are not limited to, ammonia, triethylamine, dimethylethanolamine, N-methylmorpholine, dimethyl isopropylamine, N-methyldiethanolamine, triethanolamine, aminomethyl-1-propanol, dimethylisopropanolamine, sodium hydroxide solution and potassium hydroxide solution. In certain embodiments, the degree of neutralization is 20 to 110%, such as 35 to 75%. In embodiments where the plurality of ethylenically unsaturated compounds comprises up to 1.5 wt. % carboxyl-functional monomers, based on the total weight of ethylenically unsaturated compounds, these are often in the neutralized form to the extent of at least 50%.

The choice of monomers (a1) to (a6) is such that stable polymeric dispersions are formed. In certain embodiments, the polyacrylate has a weight average molecular weight of greater than >25,000 gram/mole, such as >50,000 gram/mole, as determined by gel permeation chromatography.

In certain embodiments, the dispersion comprising a base-neutralized carboxylic acid functional polyacrylate has: a) a solids content of 30 to 55%; b) a viscosity (at 23° C., D=ca. 40 s$^{-1}$) of 10 to 5,000 mPa·s, such as 10 to 1,000 mPa·s (measured according to DIN EN ISO 3219/A.3); c) an acid number of 5 to 30 mg KOH/g, based on a solids content of 100%; d) a hydroxyl group content of 0.2 to 3.5 wt. %, based on a solids content of 100%; and e) a pH of 5.5 to 9. In some embodiments, these dispersions comprise a base-neutralized carboxylic acid functional polyacrylate comprising a reaction product of reactants comprising, consisting essentially of, or consisting of: (a1) 50 to 85% by weight of hardening vinyl aromatic monomer, such as styrene, such as 50 to 85% by weight of styrene, such as 60 to 80% by weight of styrene; (a2) 5 to 30% by weight, such as 5 to 20 or 5 to 15% by weight of n-butyl acrylate, ethyl acrylate and/or 2-ethylhexyl acrylate; (a3) 1 to 5% by weight of acrylic acid and/or methacrylic acid; and (a4) optionally 2 to 30% by weight of hydroxypropyl methacrylate, hydroxyethyl methacrylate, hydroxypropyl acrylate and/or hydroxyethyl acrylate, the sum of the % figures of (a1) to (a4) being 100%. In certain of these embodiments, 1.0 to 2.0% by weight, based on the total amount of reactants, of emulsifier or emulsifier mixtures is employed and/or 0.15 to 0.45% by weight, based on the total amount of reactants, of initiator or initiator mixtures is employed.

One example of an aqueous polyacrylate dispersion that is suitable for use in the coating compositions of the present invention is Bayhydrol® A 2427, which is an aqueous hydroxyl-functional polyacrylate dispersion, approximately 42% by weight resin solids in water, neutralized with ammonia, hydroxyl content of approximately 2% weight percent based on solids, from Bayer MaterialScience AG, Leverkusen, Germany. In this product, the polyacrylate has a calculated Tg above 70° C. and is prepared from reactants (a1)-(a4) described above in amounts within the ranges set forth in the immediately preceding paragraph.

As indicated, the coating compositions of the present invention comprise a water-miscible polyaziridine. As used herein, the term polyaziridine refers to compounds comprising at least two moieties having the structure:

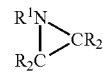

where R$^1$ is hydrogen or an alkyl radical having, for example, 1 to 3 carbon atoms, phenyl or a combination thereof and each R$^2$ is independently hydrogen or an alkylene radical having for example, 1 to 4 carbon atoms.

A specific example of a suitable water miscible polyaziridine is pentaerythritoltris-b-(aziridinyl) propionate, which is commercially available as XAMA 7 (CAS number 57116-45-7), which has a solids content of 100%, an aziridine content of 6.35-7.00 milliequivalents/gram, an aziridine functionality of about 3.3, a density at 25° C. of 1.18-1.20 grams/ml., a viscosity at 25° C. of no more than 4000 centipoise, a freezing point of less than −10° C., and is completely miscible in water.

In certain embodiments, an aqueous dispersion comprising the base-neutralized carboxylic acid functional polyacrylate described herein is present in the coating composition in an amount of at least 50% by weight, such as at least 60% by weight and/or up to 90% by weight, such as up to 80% by weight, based on the total weight of the coating composition. Moreover, in certain embodiments, the polyaziridine is present in an amount of 1% up to 10% by weight, such as 2% up to 8% by weight, based on the total weight of the coating composition. In certain embodiments, the coating compositions of the present invention comprise: at least 50% by weight, at least 70% by weight, at least 80% by weight or at least 90% by weight and/or up to 95% by weight or up to 92% by weight of a base-neutralized carboxylic acid functional polyacrylate as described herein and at least 2% by weight, such as at least 4% by weight, or, in some cases at least 5% by weight and/or up to 10% by weight, or, in some cases, up to 9% by weight, up to 8% by weight, and/or up to 7% by weight of a polyaziridine, such weight percents being based on the total weight resin solids in the coating composition. In certain embodiments, the sum the base-neutralized carboxylic acid functional polyacrylate and the polyaziridine is 100% by weight, based on the total weight of resin solids in the composition. In other embodiments, the coating composition comprises another source of resin solids.

Certain embodiments of the coating compositions of the present invention comprise a coalescing agent. As used herein, "coalescing agent" is synonymous with "cosolvent" and refers to an organic solvent that is a VOC having, in certain embodiments, an evaporation rate of less than 0.8, in some cases less than 0.1, and, in yet other cases, less than 0.01 relative to n-butyl acetate (n-butyl acetate=1.0).

Some specific examples of coalescing agents that are suitable for use in the present invention include ethylene oxide-based and/or propylene oxide-based glycol ether solvents, such as ethylene glycol monohexyl ether, diethylene glycol monomethyl ether, diethylene glycol monoethyl ether, diethylene glycol monopropyl ether, diethylene glycol monobutyl ether, ethylene glycol monobutyl ether acetate, diethylene glycol monoethyl ether acetate, dipropylene glycol n-butyl ether, including mixtures of two or more thereof.

In some embodiments of the coating compositions of the present invention the coalescing agent is present in the coating composition in an amount of at least 2% by weight, such as 2 to 10% by weight, 2 to 5% by weight, 3 to 5% by weight, or, in some cases, 3.5 to 4.5% by weight, based on the total weight of the coating composition.

The coating compositions of the present invention may further include any of a variety of coating additives such as defoamers, devolatilizers, surfactants, thickeners, flow control additives, colorants (including pigments and dyes) or surface additives.

Suitable defoamers include mineral oil defoamers, silicone defoamers, polymeric, silicone-free defoamers, and polyethersiloxane copolymers. Suitable devolatilizers include polyacrylates, dimethylpolysiloxanes, organically modified polysiloxanes such as polyoxyalkyldimethylsiloxanes, and fluorosilicones. Suitable thickeners include natural organic thickeners such as dextrins or starch; organically modified natural substances such as cellulose ethers or hydroxyethylcellulose; all-synthetic organic thickeners such as poly(meth)acrylic compounds or polyurethanes; and inorganic thickeners such as bentonites or silicas. Suitable flow control additives or surface additives include silicone additives, ionogenic or nonionogenic acrylates or low molecular weight, surface-active polymers. Substrate-wetting silicone surfactants, such as polyether-modified polydimethylsiloxanes, may also be added. In some embodiments, however, the coating compositions of the present invention do not include fluoro-containing materials.

As indicated, the coating compositions of the present invention are substantially free of isocyanate functionality. As used herein, "substantially free of isocyanate functionality" means that there is less than 0.5, such as no more than 0.2, no more than 0.1, no more than 0.05, or no more than 0.01 equivalents of free isocyanate groups in the composition per equivalents of any isocyanate-reactive groups in the composition. In some cases, the coating composition contains no detectable free isocyanate groups. As such, in certain embodiments, the coating compositions of the present invention are free of any intentionally added isocyanate-functional compounds, such as polyisocyanates.

Suitable methods for preparing the coating compositions of the present invention are described in the Examples.

The coating compositions may be applied onto surfaces using various techniques, such as spraying, dipping, flow coating, rolling, brushing, pouring, and the like. In the compositions of the present invention, the polyacrylate particles can coalesce to form a continuous film at ambient temperature, i.e., such as 20° C. to less than 30° C., such as 20° C. to 25° C. or less, if desired. As water in the coating composition evaporates, the acid groups of the polyacrylate will react with the aziridine groups of the polyaziridine, thereby crosslinking the polyacrylate with the polyaziridine crosslinking agent to form a cured coating. The crosslinking reactions may occur at ambient temperature, i.e., below 30° C., or higher temperatures, such as 40° C. to 200° C., if desired.

The coating compositions can be applied onto any compatible substrate, such as, for example, cellulosic materials (such as paper and wood), metals, plastics (such as vinyl, such as PVC, polyesters or polyamides), ceramics, glass, concrete, and other organic or inorganic materials or natural materials, such as fiber board, particle board, gypsum board, and/or stone, and to substrates that have been subjected to any pretreatment that may be desirable.

It has been surprisingly discovered, however, that the coating compositions of the present invention, which can be suitable for DIY application, produce surfaces with dry-erase properties, including surfaces that are dry-erasable after long term exposure to a dry-erase marking. That is, coating compositions of the present invention are capable of producing a coated surface that is dry-erasable (meaning that after erasing a marking from a marker pen with a dry cloth, a dry paper towel, a dry tissue, or a dry eraser, the marking is no longer visible to the naked eye) even when a marking from a dry erase marker pen is left on the surface for a long period of time, such as up to 5 days.

As a result, certain embodiments of the present invention are directed to methods of using the coating compositions of the present invention, comprising: (A) applying the composition to a substrate; and (B) allowing the composition to cure (in some cases at ambient temperature) to form a cured coating, wherein the substrate comprises a wall, a chalkboard or a blackboard and/or wherein the substrate comprises a material comprising a ceramic, a polymer (such as polyester or polyamide), a cellulosic material (such as paper or wood), glass, fiber board, particle board, gypsum board, stone, and/or metal. Such methods may further comprise writing on the cured coating with a dry-erase marker pen and erasing the writing with, for example, a dry cloth, a dry paper towel, a dry tissue and/or a dry eraser.

In addition, embodiments of the present invention are directed to a kit comprising one or more containers and a marker pen, such as a dry-erase marker pen. As used herein, "marker pen" refers to a device having a tip made of porous fibers, such as felt, and a container that contains a colorant (such as a pigment) and a solvent (such as an alcohol). In certain embodiments, the kit comprises: (a) a first container comprising a base-neutralized carboxylic acid functional polyacrylate as described herein; and (b) a second container comprising a polyaziridine, wherein (a) and (b) are substantially free of isocyanate functionality. In other embodiments, the kit comprises a container comprising (i) a base-neutralized carboxylic acid functional polyacrylate as described herein, and (ii) a polyaziridine, wherein the container is substantially free of isocyanate functionality. In some embodiments, such kits further comprise a cloth or an eraser.

Another possible application for the coating compositions of the present invention is application on a frame of an architectural article, such as a door or window frame, particularly those that are constructed of a vinyl material, such as PVC. The coating compositions of the present invention may produce a cured coating that, when used as a frame of an architectural article, such as a door or window, meets or exceeds many if not all of the requirements of AAMA specification 615-05, Performance Requirements and Test Procedures for Superior Performing Organic Coatings on Plastic Profiles, revised December 05 (referred to herein as "AAMA 615-05"). For example, cured coatings deposited from the coating compositions of the present invention, when deposited over a synthetic substrate, such as PVC, may pass the dry adhesion and boiling water adhesion tests described in AAMA 615-05, section 6.4 and the detergent resistance test described in AAMA 615-05, section 6.7.4.

As will be appreciated by the foregoing description, embodiments of the present invention are directed to coating compositions comprising: waterborne coating composition comprising: (a) a base-neutralized carboxylic acid functional polyacrylate having a calculated Tg of greater than 50° C. and that is a reaction product of reactants comprising: (a1) at least 50% by weight of a hardening vinyl aromatic monomer, based on the total weight of the reactants; (a2) a plasticizing ethylenically unsaturated monomer that does not include carboxylic acid or hydroxyl groups; and (a3) a carboxylic-acid functional ethylenically unsaturated monomer; and (b) a water-miscible polyaziridine, wherein the coating composition is substantially free of isocyanate functionality.

Some embodiments of the present invention are directed to a coating composition of the previous paragraph, wherein the coating composition comprises no more than 350 grams, such as no more than 300 grams or no more than 250 grams of VOC per liter of the coating composition.

In some embodiments, the present invention is directed to a coating composition of either of the previous two paragraphs, wherein the coating composition has an initial viscosity at 23° C. of less than 1000 cPs, such as less than 500 cPs, less than 300 cPs, less than 200 cPs, or, in some cases, less than 100 cPs.

Embodiments of the present invention are also directed to a waterborne coating composition of any of the previous three paragraphs, in which the coating composition is prepared by mixing (a) an aqueous dispersion comprising a base-neutralized carboxylic acid functional polyacrylate with (b) a water-miscible polyaziridine.

Certain embodiments of the present invention are directed to a coating composition of any of the previous four paragraphs, wherein the base-neutralized carboxylic acid functional polyacrylate has a calculated Tg of greater than 50° C., such as at least 60° C., at least 65° C. or at least 70° C.

In some embodiments, the present invention is directed to a coating composition of any of the previous five paragraphs, wherein reactant (a1) comprises styrene, such as where styrene is used in an amount of at least 50% by weight, such as greater than 50, at least 60, at least 70, at least 80, at least 90, or, in some cases 100% by weight, based on the total weight of reactant (a1).

Embodiments of the present invention are also directed to a coating composition of any of the previous six paragraphs, wherein reactant (a1), such as styrene, is used in an amount of greater than 50% by weight, at least 60, or at least 65% by weight and/or up to 95% by weight, up to 90% by weight or up to 80% by weight, based on the total weight of reactants used to make the polyacrylate.

Certain embodiments of the present invention are directed to a coating composition of any of the previous seven paragraphs, wherein reactant (a2) comprises n-butyl acrylate, such as where n-butyl acrylate is used in an amount of at least 50% by weight, such as at least 60, at least 70, at least 80, at least 90, or, in some cases 100% by weight, based on the total weight of reactant (a2).

In some embodiments, the present invention is directed to a coating composition of any of the previous eight paragraphs, wherein reactant (a2), such as n-butyl acrylate, is used in an amount of at least 1% by weight, such as at least 2, or at least 5% by weight and/or up to 20% by weight, such as up to 15% by weight, based on the total weight of reactants used to make the polyacrylate.

In certain embodiments, the present invention is directed to a coating composition of any of the previous nine paragraphs, wherein reactant (a3), such as methacrylic acid and/or acrylic acid, is used in an amount of at least 1% by weight, such as at least 2% by weight, and/or up to 10% by weight, such as up to 5% by weight, based on the total weight of reactants used to make the polyacrylate and/or wherein reactant (a3), such as methacrylic acid and/or acrylic acid, is used in an amount sufficient to provide the polyacrylate with an acid value of 1 to 30 mg KOH/gram solids, such as 5 to 30 mg KOH/gram solids or, in some cases, 5 to 15 mg KOH/gram solids.

Some embodiments of the present invention are directed to a coating composition of any of the previous ten paragraphs, wherein the sum of reactants (a1) and (a3) comprises at least 70% by weight, based on the total weight of the reactants used to make the polyacrylate.

Certain embodiments of the present invention are directed to a coating composition of any of the previous eleven paragraphs, wherein the dispersion comprising a base-neutralized carboxylic acid functional polyacrylate has: a) a solids content of 30 to 55%; b) a viscosity (at 23° C., D=ca. 40 s$^{-1}$) of 10 to 5,000 mPa·s, such as 10 to 1,000 mPa·s (measured according to DIN EN ISO 3219/A.3); c) an acid number of 5 to 30 mg KOH/g, based on a solids content of 100%; d) a hydroxyl group content of 0.2 to 3.5 wt. %, based on a solids content of 100%; and e) a pH of 5.5 to 9.

In certain embodiments, the present invention is directed to a coating composition of any of the previous twelve paragraphs, wherein the polyacrylate comprises a reaction product of reactants comprising, consisting essentially of, or consisting of: (a1) 50 to 85% by weight of hardening vinyl aromatic monomer, such as styrene, such as 50 to 85% by weight of styrene, such as 60 to 80% by weight of styrene; (a2) 5 to 30% by weight, such as 5 to 20 or 5 to 15% by weight of n-butyl acrylate, ethyl acrylate and/or 2-ethylhexyl acrylate; (a3) 1 to 5% by weight of acrylic acid and/or methacrylic acid; and (a4) optionally 2 to 30% by weight of hydroxypropyl methacrylate, hydroxyethyl methacrylate, hydroxypropyl acrylate and/or hydroxyethyl acrylate, the sum of the % figures of (a1) to (a4) being 100%.

Certain embodiments of the present invention are directed to a coating composition of any of the previous thirteen paragraphs, wherein the water-miscible polyaziridine comprises pentaerythritoltris-b-(aziridinyl) propionate.

Some embodiments of the present invention are directed to a coating composition of any of the previous fourteen paragraphs, wherein the base-neutralized carboxylic acid functional polyacrylate described herein is present in the coating composition in an amount of at least 50% by weight, such as at least 60% by weight and/or up to 90% by weight, such as up to 80% by weight, based on the total weight of the coating composition and/or the polyaziridine is present in an amount of 1% up to 10% by weight, such as 2% up to 8% by weight, based on the total weight of the coating composition.

In certain embodiments, the present invention is directed to a coating composition of any of the previous fifteen paragraphs, wherein the coating composition comprises: at least 50% by weight, at least 70% by weight, at least 80% by weight or at least 90% by weight and/or up to 95% by weight or up to 92% by weight of a base-neutralized carboxylic acid functional polyacrylate and at least 2% by weight, such as at least 4% by weight, or, in some cases at least 5% by weight and/or up to 10% by weight, or, in some cases, up to 9% by weight, up to 8% by weight, and/or up to 7% by weight of a polyaziridine, such weight percents being based on the total weight resin solids in the coating composition.

Certain embodiments of the present invention are directed to a coating composition of any of the previous sixteen paragraphs, wherein the composition further comprises a coalescing agent having an evaporation rate of less than 0.8, in some cases less than 0.1, and, in yet other cases, less than 0.01 relative to n-butyl acetate (n-butyl acetate=1.0). In some of these embodiments, the coalescing agent is present in the coating composition in an amount of at least 2% by weight, such as 2 to 10% by weight, 2 to 5% by weight, 3 to 5% by weight, or, in some cases, 3.5 to 4.5% by weight, based on the total weight of the coating composition.

Some embodiments of the present invention are directed to a coating composition of any of the previous seventeen paragraphs, wherein the coating composition comprises no more than 0.2, no more than 0.1, no more than 0.05, or no more than 0.01 equivalents of free isocyanate groups per equivalents of any isocyanate-reactive groups in the composition. In some of these embodiments, the coating composition contains no detectable free isocyanate groups. In certain of these embodiments, the coating compositions of the present invention are free of any intentionally added isocyanate-functional compounds, such as polyisocyanates.

Embodiments of the present invention are directed to a method of using a coating composition of any of the previous eighteen paragraphs, comprising: (A) applying the composition to a substrate; and (B) allowing the composition to cure (in some cases at ambient temperature) to form a cured coating, wherein the substrate comprises a wall, a chalkboard or a blackboard and/or wherein the substrate comprises a material comprising a ceramic, a polymer (such as polyester or polyamide), a cellulosic material (such as paper or wood), glass, fiber board, particle board, gypsum board, stone, and/or metal. In some cases, such methods further comprise writing on the cured coating with a dry-erase marker pen and erasing the writing with, for example, a dry cloth, a dry paper towel, a dry tissue and/or a dry eraser. In some embodiments, the substrate comprises a vinyl material, such as PVC and/or the substrate is a frame of an architectural article, such as a door or window.

Some embodiments of the present invention are directed to a kit comprising a coating composition of any of the previous nineteen paragraphs and a marker pen, such as a dry-erase marker pen. In some of these embodiments, the kit comprises: (a) a first container comprising a base-neutralized carboxylic acid functional polyacrylate as described herein; and (b) a second container comprising a polyaziridine, wherein (a) and (b) are substantially free of isocyanate functionality. In other of these embodiments, the kit comprises a container comprising (i) a base-neutralized carboxylic acid functional polyacrylate as described herein, and (ii) a polyaziridine, wherein the container is substantially free of isocyanate functionality. In some embodiments, such kits further comprise a cloth or an eraser.

The non-limiting and non-exhaustive examples that follow are intended to further describe various non-limiting and non-exhaustive embodiments without restricting the scope of the embodiments described in this specification.

EXAMPLES

Example 1

Formulations 1A-1D were prepared using the ingredients and amounts (in grams) listed in Table 1. To prepare the component 1, the acrylic dispersion was added into a small mixing container. A mixer was added and the acrylic dispersion was mixed under low shear conditions. In another container, the other ingredients of component 1 were pre-mixed. This mixture was then added slowly into the dispersion to form component 1. Component 1 was mixed until homogeneous (~20 minutes under low shear conditions). Once component 1 was thoroughly mixed, component 2 was added and stirred in with a paint stick by hand for several minutes. Upon completion of the mixing, the formulation was ready for application and testing.

TABLE 1

|  | 1A | 1B | 1C | 1D |
| --- | --- | --- | --- | --- |
| Component 1 | | | | |
| Bayhydrol ® A 2427[1] | 50 | 50 | 50 | 50 |
| DOWANOL ™ DPnB[2] | 6.16 | 6.16 | 6.16 | 6.16 |
| Deionized Water | 5.0 | 5.0 | 5.0 | 5.0 |
| BYK ®-349[3] | 0.24 | 0.24 | 0.24 | 0.24 |
| Component 2 | | | | |
| XAMA 7[4] | 1.0 | 2.0 | 3.0 | 4.0 |

[1]An aqueous, hydroxyl-functional styrene polyacrylate (calculated Tg above 70° C. and comprising greater than 50% by weight styrene, based on the total weight of reactants used to make the polyacrylate) dispersion, approximately 42% solids in water, neutralized with ammonia, Bayer MaterialScience AG, Leverkusen, Germany.
[2]Dipropylene Glycol n-Butyl Ether, The Dow Chemical Company, Midland, Michigan.
[3]Silicone surfactant, BYK USA Inc.
[4]Polyaziridine, Bayer MaterialScience LLC, Pittsburgh, PA.

Each of formulations 1A-1D were drawn-down on glass test panels to a wet film thickness of 5 mils (127 µm) and the samples were allowed to cure at room temperature of 72° F. (22.2° C.) and 50% humidity for a period of 7 days prior to testing. Dry erase testing was completed by writing on the surface with each of the following commercially available dry erase marker pens: (i) Quartet® EnduraGlide® Dry-Erase Marker (red); (ii) Staples® Dry-Erase Marker (green); (iii) Expo® Low Odor Dry-Erase Marker (black); and (iv) Crayola® Dry-Erase Marker (blue). After each marking, the solvent was allowed to evaporate (~10 seconds wait time) and the marks were then wiped with a dry paper towel to determine dry eraseability. Long-term dry erase was also evaluated by writing on the surface with the dry erase marker pens and allowing the marks to sit for 5 days before attempting to erase. In Table 2, "Y+" means the coating exhibited excellent dry erase properties with little effort to remove the markings. Pendulum hardness after 1, 3, 7, and 14 days was evaluated according to ASTM D 4366-95 test method A. Results are set forth in Table 2.

TABLE 2

| | Pendulum Hardness (s) | | | | | |
| --- | --- | --- | --- | --- | --- | --- |
| Example | 1 day | 3 days | 7 days | 14 days | Dry Erase | Long-term Dry Erase |
| 1A | 50.4 | 113.4 | 156.8 | 158.2 | Y+ | Y+ |
| 1B | 44.8 | 102.2 | 141.4 | 161.0 | Y+ | Y+ |
| 1C | 56.0 | 113.4 | 163.8 | 169.4 | Y+ | Y+ |
| 1D | 51.8 | 121.8 | 155.4 | 170.8 | Y+ | Y+ |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. §112, first paragraph, and 35 U.S.C. §132(a).

What is claimed is:

1. A waterborne coating composition comprising:
   (a) a carboxylic acid functional polyacrylate having a calculated Tg of greater than 50° C. that is a reaction product of reactants comprising:
      (a1) at least 50% by weight, based on the total weight of the reactants, of a hardening vinyl aromatic monomer selected from the group consisting of dimethylstyrene, 2,5-dimethylstyrene, 3,4-dimethylstyrene, 3,5-dimethylstyrene, 2-ethylstyrene, α-methylstyrene, 2-methylstyrene, 3-methylstyrene, 4-methylstyrene, 4-methoxystyrene and styrene;
      (a2) a plasticizing ethylenically unsaturated monomer that does not include carboxylic acid or hydroxyl groups, the monomer selected from the group consisting of methyl acrylate, ethyl acrylate, n-propyl acrylate, isopropyl acrylate, n-butyl acrylate, iso-butyl acrylate, n-hexyl acrylate, 2-ethylhexyl acrylate, dodecyl acrylate, n-hexyl methacrylate, n-octyl methacrylate, 2-ethylhexyl methacrylate, decyl methacrylate, dodecyl methacrylate; and
      (a3) a carboxylic-acid functional ethylenically unsaturated monomer selected from the group consisting of acrylic acid, (meth)acrylic acid, maleic acid, maleic anhydride, fumaric acid, crotonic acid, maleic acid monoalkyl esters, fumaric acid monoalkyl esters, itaconic acid and propylacrylic acid; and
   (b) a water-miscible polyaziridine,
wherein the coating composition is substantially free of isocyanate functionality; and
wherein the carboxylic acid groups of the polyacrylate are base-neutralized during or after the reaction.

2. The coating composition of claim 1, wherein the calculated Tg is at least 60° C.

3. The coating composition of claim 2, wherein the calculated Tg is at least 65° C.

4. The coating composition of claim 3, wherein the calculated Tg is at least 70° C.

5. The coating composition of claim 1, wherein the composition has a viscosity at 23° C. of less than 1000 cPs.

6. The coating composition of claim 1, wherein the reactants further comprise:
   (a4) a hydroxyl functional ethylenically unsaturated monomer.

7. The coating composition of claim 1, wherein (a1) comprises styrene in an amount of at least 80% by weight, based on the total weight of reactant (a1).

8. The coating composition of claim 1, wherein the sum of monomers (a1) and (a3) comprises at least 70% by weight, based on the total weight of reactants used to make the polyacrylate.

9. The coating composition of claim 1, comprising:
   (a1) 50 to 85% by weight styrene;
   (a2) 5 to 30% by weight of n-butyl acrylate, ethyl acrylate and/or 2-ethylhexyl acrylate;
   (a3) 1 to 5% by weight of acrylic acid and/or methacrylic acid;
   (a4) optionally 2 to 30% by weight of hydroxypropyl methacrylate, hydroxyethyl methacrylate, hydroxypropyl acrylate and/or hydroxyethyl acrylate,
wherein the sum of the % by weights of (a1) to (a4) is 100.

10. The coating composition of claim 1, comprising:
    (i) at least 70% by weight of the carboxylic acid functional polyacrylate; and
    (ii) at least 2% by weight of the water-miscible polyaziridine,
wherein the weight percents are based on the total weight of resin solids in the coating composition.

11. The coating composition of claim 1, wherein the composition comprises no more than 0.2 equivalents of free isocyanate groups per equivalents of any isocyanate-reactive groups.

12. A method of using the coating composition of claim 1, comprising:
    (A) applying the composition to a substrate; and
    (B) allowing the composition to cure at ambient temperature to form a cured coating, wherein the substrate comprises a wall, a chalkboard or a blackboard and/or a material comprising a cellulosic material, fiber board, particle board, and/or gypsum board.

13. A kit comprising:
    (a) the coating composition of claim 1; and
    (b) a marker pen.

14. A method of using the coating composition of claim 1, comprising:
    (A) applying the composition to a substrate; and
    (B) allowing the composition to cure at ambient temperature to form a cured coating,
wherein the substrate is a frame of an architectural article.

* * * * *